United States Patent [19]
Morgan

[11] Patent Number: 5,259,996
[45] Date of Patent: Nov. 9, 1993

[54] LOW PROFILE CASCADE AERATOR

[76] Inventor: Thomas H. Morgan, Rte. 1, Box 171B, Saltillo, Miss. 38866

[21] Appl. No.: 990,106

[22] Filed: Dec. 14, 1992

[51] Int. Cl.$^5$ .............................................. B01F 3/04
[52] U.S. Cl. ............................................... 261/114.1
[58] Field of Search .................... 261/114.1, 108, 122.1

[56] References Cited

U.S. PATENT DOCUMENTS

| | | | |
|---|---|---|---|
| 337,446 | 3/1886 | Scott et al. | 261/114.1 |
| 691,880 | 1/1902 | Snyder | 261/114.1 |
| 730,938 | 6/1903 | Luedke | 261/114.1 |
| 829,700 | 8/1906 | Drees | 261/114.1 |
| 1,869,344 | 7/1932 | Schonbein | 261/114.1 |
| 2,013,577 | 9/1935 | Pardee | 261/114.1 |
| 2,865,617 | 12/1958 | Dickens et al. | 261/114.1 |
| 2,884,236 | 4/1959 | Maille | 261/114.1 |
| 3,729,179 | 4/1973 | Keller | 261/114.1 |
| 4,132,761 | 1/1979 | Mix | 261/114.1 |
| 4,556,522 | 12/1985 | Wilson | 261/114.1 |

*Primary Examiner*—Tim Miles
*Attorney, Agent, or Firm*—Dressler, Goldsmith, Shore & Milnamow, Ltd.

[57] ABSTRACT

A cascade aerator comprising a trough having a low profile slope of from 4° to 5.5°. The trough is divided into a plurality of adjacent longitudinal channels. A flow control weir is mounted at the head of each of the channels and the height of the weirs increases form one channel to the next. Low head baffles are mounted in spaced relationship and transversely of the longitudinal channels.

7 Claims, 1 Drawing Sheet

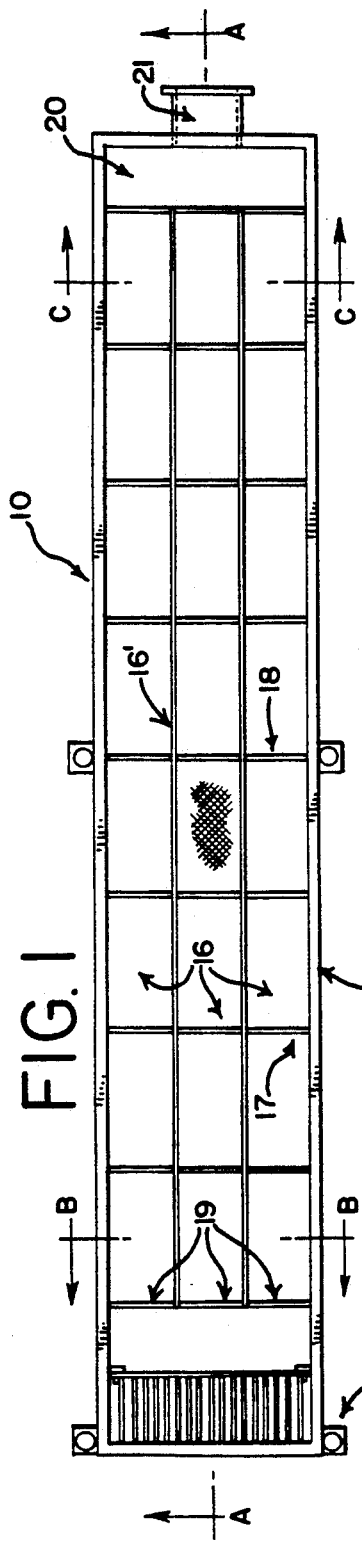
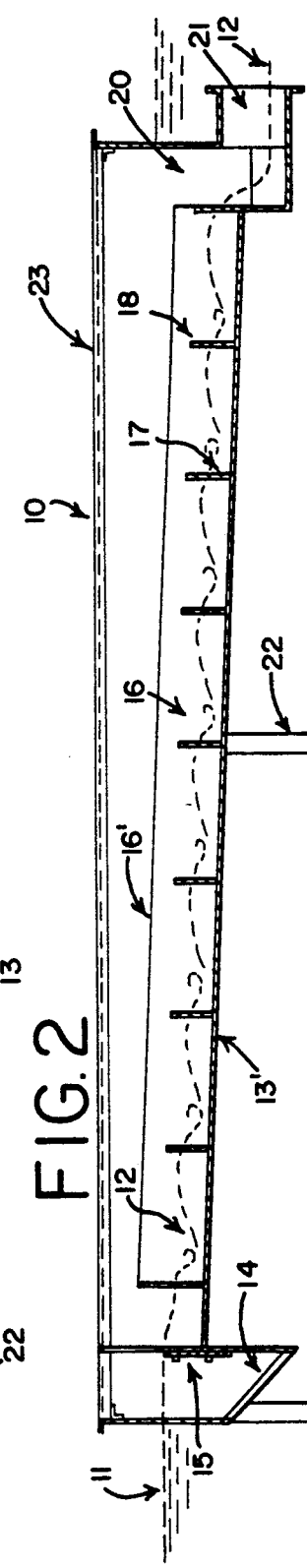
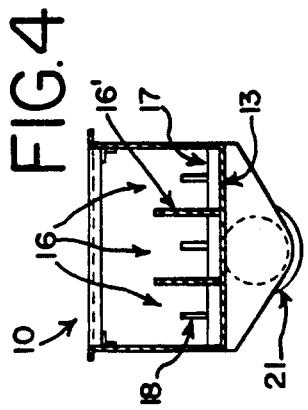
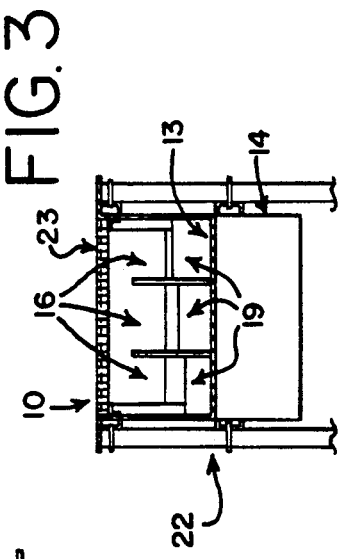

LOW PROFILE CASCADE AERATOR

BACKGROUND OF THE INVENTION

This invention relates generally to an open channel-type aerator for use in a liquid-containing basin, tank, or reservoir. More particularly, the invention relates to a low profile cascade postaerator disposed in a liquid-containing basin for the purpose of raising the dissolved oxygen (DO) concentration level of the basin effluent.

Until recently, most publicly and privately owned wastewater treatment facilities were not required to meet DO limits as criteria for discharge. Now, more stringent water quality standards Have been imposed by Federal Regulations governing the effluent limits of treatment facilities. Current criteria specify a DO concentration between 3 and 6 mg/l, depending on the receiving stream requirements. Most existing wastewater treatment facilities cannot meet the newly implemented DO criteria. Consequently, postaeration must be added for compliance.

Several known postaeration methods have been employed for oxygen transfer. In general, the methods most commonly used are various types of mechanical or conventional cascade aeration. Each of these methods has the disadvantage of being an expensive addition to existing wastewater treatment facilities.

Mechanical aeration requires the addition of an aeration basin with adequate liquid retention capacity for oxygen infusion by electrically powered aeration equipment. This is the least desirable method of boosting the oxygen levels, but in the past was the only available solution. There are two cost factors involved with mechanical aeration. First, the high initial investment for the basin and equipment; second, the ongoing maintenance and operating expense.

Cascade postaeration installations are more desirable and cost effective. There is no power consumption or maintenance expense, the primary requirement for the application of a cascade aerator being sufficient elevation to produce a water fall. The normal requirement for oxygen transfer through prior art cascade aeration is twelve inches of water fall for each mg/l increase. For example, to raise the oxygen concentrations 6 mg/l, a minimum fall of six feet typically would be required. Most existing facilities lack ample elevation for the utilization of prior art cascade aerators.

It will thus be appreciated that postaeration as the final stage of treatment is rarely without considerable expense, initially or in operation and maintenance.

SUMMARY OF THE INVENTION

A low profile fabricated cascade aerator in accordance with this invention eliminates or ameliorates most of the foregoing problems. This invention is a simple, free flowing, efficient, packaged, channel-type aeration device that can be installed in most existing treatment facilities at a reasonable cost.

This invention is a cascade only in the sense that it is water gravitating successively over stages of baffles. Contrary to the true sense of prior art cascades where water falls steeply from one step to the next creating splashing effects, the low profile aerator utilizes optimum slopes of 4° to 5.5° with turbulence control aeration baffles with air infusion plates; incrementally spaced along the channel, optimizing the turbulent reactions of hydraulic jumps created by the baffles. The baffles create dams and segments along the channel, each creating greater depth and lower velocity upstream of the baffles with increased velocity as the liquid flows over the baffles and falls to the next stage or segment. The increased velocity creates a shallow depth in the channel downstream of each baffle that crashes the liquid into the tail water of the deeper water formed by the successive baffle. The turbulence control baffles are fitted with air infusion plates. The plates are mounted vertically on top of the baffles to form air tubes from the atmospheric surface down to the crest of the baffles. Pressure differentials cause the air to run the crest and disperse in the form of fine bubbles into the liquid; enhancing oxygen transfer. Spacing is dependent upon flow rates and velocity of the liquid.

The impact of the high velocity water with the lower velocity water as it flows creates great turbulence, erupting the liquid with a forceful effervescence. Oxygen in the entrained air is absorbed by liquid through surface contact. The greater the water-air skin contact, the greater the oxygen transfer. Pressure differential created as water flows over a baffle also creates an undertow and backflow action, circulating the liquid within each segment of the channel and thereby exposing the liquid to the atmosphere with each pass absorbing more oxygen. The refined small air bubbles and mixing created by the utilization of natural gravitational forces through controlled application of velocity, pressure differentials, baffles, air infusion plates, baffle spacing, baffle height, channel depth, and optimum controlled head over the baffles with minimum head loss throughout the unit make this invention efficiently effective to provide up to 6 mg/l with less than two feet fall in elevation.

Numerous other advantages and features of the present invention will become apparent from the following detailed description of the invention, from the claims, and from the accompanying drawings.

BRIEF DESCRIPTION OF THE DRAWINGS

In the accompanying drawings forming a part of the specification, and in which like numerals are employed to designate like parts throughout, FIG. 1 is a top plan view of a low profile cascade aerator embodying the principles of the invention;

FIG. 2 is a vertical sectional view on the plane of line A—A in FIG. 1;

FIG. 3 is a sectional view on the plane of line B—B in FIG. 1; and

FIG. 4 is a sectional view on the plane of line C—C in FIG. 1.

DESCRIPTION OF THE PREFERRED EMBODIMENT

Referring in greater detail to the drawing figures, a low profile cascade aerator 10 in accordance with the present invention is provided in a liquid-containing basin 11 for increasing the dissolved oxygen level of the effluent liquid 12. The basin 11 may comprise a tank, reservoir or pipe line which receives the final effluent from a wastewater treatment facility.

The aerator 10 comprises a sluice or trough 13 having a sloping bottom wall 13' with a preferred gradient of between 4° and 5.5°. The trough 13 is divided or compartmented into a plurality of o longitudinal channels 16 by divider means 16' mounted on the bottom wall 13'. Inlet 14 of the aerator is submerged below the liquid surface to inhibit floatable solids from passing through the aerator 10. A horizontal, sharp crested weir 15 is provided at the inlet 14 for flow monitoring and basin low water level control. The weir 15 can be adjusted upwardly for varying the basin liquid level.

The channels 16 are provided with a plurality of transverse low head aeration baffles 17 which function to create velocity and pressure changes throughout the length of the channels. Baffle 17 spacing is preferably 24" apart. Air infusion plates 18, preferably 1¼" wide, are attached to the crest of the baffles 17 for injecting oxygen-laden air into the liquid. The plates 18 form an air duct that communicates to the crest of the aeration baffle 17, whereby the air disperses along the length of the baffle 17 crest.

Each longitudinal channel 16 is controlled at the inlet with a flow control weir 19. Adjacent flow control weirs 19 are stepped or increased in height, preferably in increments of one inch (see FIG. 3). As the flow through the first channel 26 reaches a preferred depth of 4 inches, the liquid rises above the control weir 19 of the next adjacent channel 16. The same progression is repeated through the third or more channels 16 as flow rates increase. The first stage channel 16 is designed for the minimum flow rate of the treatment facility being served.

All channels 16 slope downwardly and direct flow to a common receptacle 20. The receptacle 20 connects to an opening 21 that communicates with the exterior of the basin.

The aerator 10 preferably is provided with adjustable legs 22. The legs 22 provide means for supporting, leveling and anchoring the aerator 10, and thereby provide adaptability as necessary for retrofitting to existing treatment facilities.

The top of the aerator 10 may be covered with an extruded grating 23. The grating 23 serves to provide protection for the aerator 10 from flying debris and animals and also serves as a service platform.

It should be appreciated that a preferred embodiment of the invention has been described herein for illustrative purposes only and is not otherwise limiting of the concepts of the invention. Accordingly, exchanges and variations may be made by those skilled in the art without departing from the spirit and scope of the invention as defined in the appended claims.

What is claimed is:

1. A cascade aerator for increasing the level of dissolved oxygen flowing therethrough comprising:
   an elongated trough having a sloping bottom wall inclined slightly from the horizontal and from head to tail;
   divider means on said bottom wall separating said trough into a plurality of longitudinal flow channels;
   a plurality of low head baffles mounted on said bottom wall in spaced relationship and transversely of said flow channels; and
   a flow control weir at the head of each of said channels, the weirs of each of said channels increasing successively in height over the preceding weir immediately adjacent hereto.

2. A cascade aerator according to claim 1 wherein the slope of said bottom wall is between 4° and 5.5°.

3. A cascade aerator according to claim 1 wherein the spacing between adjacent baffles is approximately 24 inches.

4. A cascade aerator according to claim 1 wherein all of said channels direct liquids flowing therethrough to a common receptacle at the tail of the trough for final discharge therefrom.

5. A cascade aerator according to claim 1 wherein the incremental increase in height of adjacent weirs is 1 inch.

6. 5. A cascade aerator according to claim 5 comprising air infusion plates mounted on said baffles.

7. 6. A cascade aerator according to claim 6 comprising an adjustable weir mounted in said trough at the inlet thereof.

* * * * *